(12) United States Patent
Shavit et al.

(10) Patent No.: US 7,103,887 B2
(45) Date of Patent: Sep. 5, 2006

(54) LOAD-BALANCING QUEUES EMPLOYING LIFO/FIFO WORK STEALING

(75) Inventors: Nir N. Shavit, Cambridge, MA (US); Steven K. Heller, Acton, MA (US); Christine H. Flood, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 709 days.

(21) Appl. No.: 09/893,256

(22) Filed: Jun. 27, 2001

(65) Prior Publication Data

US 2003/0005025 A1    Jan. 2, 2003

(51) Int. Cl.
*G06F 9/46* (2006.01)
*G06F 12/00* (2006.01)

(52) U.S. Cl. ...................... 718/102; 710/200
(58) Field of Classification Search ................. 718/105, 718/102; 710/200
See application file for complete search history.

(56) References Cited

U.S. PATENT DOCUMENTS

| | | | |
|---|---|---|---|
| 4,482,956 A * | 11/1984 | Tallman | 710/200 |
| 4,584,640 A | 4/1986 | MacGregor et al. | |
| 4,775,932 A | 10/1988 | Oxley et al. | |
| 4,912,629 A | 3/1990 | Shuler, Jr. | |
| 4,989,134 A | 1/1991 | Shaw | |
| 5,088,036 A | 2/1992 | Ellis et al. | |
| 5,241,673 A | 8/1993 | Schelvis | |
| 5,274,804 A | 12/1993 | Jackson et al. | |
| 5,355,483 A | 10/1994 | Serlet | |
| 5,410,722 A * | 4/1995 | Cornaby | 718/102 |
| 5,446,901 A | 8/1995 | Owicki et al. | |
| 5,577,246 A | 11/1996 | Priddy et al. | |
| 5,692,185 A | 11/1997 | Nilsen et al. | |
| 5,692,193 A | 11/1997 | Jagannathan et al. | |
| 5,893,121 A | 4/1999 | Ebrahim et al. | |
| 5,930,807 A | 7/1999 | Ebrahim et al. | |
| 5,950,205 A | 9/1999 | Aviani, Jr. | |
| 6,047,295 A | 4/2000 | Endicott et al. | |
| 6,052,699 A | 4/2000 | Huelsbergen et al. | |
| 6,081,665 A | 6/2000 | Nilson et al. | |
| 6,192,517 B1 | 2/2001 | Agesen et al. | |
| 6,226,653 B1 | 5/2001 | Alpern et al. | |
| 6,240,422 B1 | 5/2001 | Atkins et al. | |
| 6,249,793 B1 | 6/2001 | Printezis et al. | |
| 6,253,215 B1 | 6/2001 | Agesen et al. | |

(Continued)

OTHER PUBLICATIONS

Leslie Lamport, Providing the Correctness of Multiprocess Programs, IEEE Transaction on Software Engineering, vol. SE-3, No. 2, Mar. 1977, pp. 125-143.

(Continued)

*Primary Examiner*—Meng-Al T. An
*Assistant Examiner*—Camquy Truong
(74) *Attorney, Agent, or Firm*—Kudirka & Jobse, LLP

(57) ABSTRACT

In response to source code that represents instructions for dynamically allocating memory to objects, a compiler/interpreter produces instructions that implement a garbage collector. The garbage collector operates in garbage-collection cycles, which include parallel-execution operations such as locating reachable objects. Each thread maintains a respective task queue onto which it pushes identifiers of objects thus found and from which it pops those identifiers in order to begin the tasks of locating the further objects to which objects specified by the thus-popped identifiers refer. A thread's access to its respective task queue ordinarily occurs on a last-in, first-out basis, but the access mode switches to a first-in, first-out basis if the number of task-queue entries exceeds a predetermined threshold.

26 Claims, 12 Drawing Sheets

U.S. PATENT DOCUMENTS

| | | | |
|---|---|---|---|
| 6,286,016 | B1 | 9/2001 | Heller et al. |
| 6,289,360 | B1 | 9/2001 | Kolodner et al. |
| 6,304,949 | B1 | 10/2001 | Houldsworth |
| 6,314,436 | B1 | 11/2001 | Houldsworth |
| 6,314,478 | B1 | 11/2001 | Etcheverry |
| 6,317,756 | B1 | 11/2001 | Kolodner et al. |
| 6,321,240 | B1 | 11/2001 | Chilimbi et al. |
| 6,338,073 | B1 | 1/2002 | Houldsworth et al. |
| 6,341,293 | B1 | 1/2002 | Hennessey |
| 6,374,339 | B1 | 4/2002 | Iivonen |
| 6,377,984 | B1 | 4/2002 | Najork et al. |
| 6,381,735 | B1 | 4/2002 | Hunt |
| 6,411,964 | B1 | 6/2002 | Iyer et al. |
| 6,415,302 | B1 | 7/2002 | Garthwaite et al. |
| 6,427,154 | B1 | 7/2002 | Kolodner et al. |
| 6,434,575 | B1 | 8/2002 | Berry et al. |
| 6,480,862 | B1 | 11/2002 | Gall |
| 6,493,730 | B1 | 12/2002 | Lewis et al. |
| 6,526,422 | B1 | 2/2003 | Flood et al. |
| 6,542,911 | B1 | 4/2003 | Chakraborty et al. |
| 6,560,619 | B1 | 5/2003 | Flood et al. |
| 6,571,260 | B1 | 5/2003 | Morris |
| 6,651,101 | B1 | 11/2003 | Gai et al. |
| 6,671,707 | B1 | 12/2003 | Hudson et al. |
| 6,763,452 | B1 | 7/2004 | Hohensee et al. |
| 2001/0000821 | A1 | 5/2001 | Kolodner et al. |
| 2001/0047361 | A1 | 11/2001 | Martin et al. |
| 2001/0049726 | A1 | 12/2001 | Comeau et al. |
| 2002/0052926 | A1 | 5/2002 | Bush et al. |
| 2002/0073103 | A1 | 6/2002 | Bottomley et al. |
| 2002/0095453 | A1 | 7/2002 | Steensgaard |
| 2003/0005025 | A1 | 1/2003 | Shavit et al. |
| 2003/0005029 | A1 | 1/2003 | Shavit et al. |
| 2004/0088702 | A1 | 5/2004 | Garthwaite et al. |

OTHER PUBLICATIONS

Adity, et al., "Garbage Collection for Strongly-Typed Languages using Run-Time Reconstruction", ACM, 1994, 16-20.

Appel, "Simple Generational Garbage Collection and Fast Allocation", Software Practice and Experience, 19(2), 1989, 171-183.

Arora, et al., "Thread Scheduling for Multiprogrammed Multiprocessors", Dept. of Computer Science, Uni. of Texas, 1998, Austin.

Baker, "List Processing in Real Time on a Serial Computer", Communications of the ACM 21, Apr. 1978, 280-294.

Bibolet, et al., "Asynchronous Service Routine Invocation with Safely Serialized Work Queue", IBM Tech. Disclosure Bulletin, vol. 25, No. 8, Jan. 1983, IBM Corp.

Blelloch, et al., "On Bounding Time and Space for Multiprocessor Garbage Collection", Computer Science Department, Carnegie Mellon University, date unknown.

Blumofe, "Scheduling Multithreaded Computations by Work Stealing", University of Texas, 1998, Austin.

Boehm, "Simple Garbage Collector-Safety", ACM, May 1996, 89-98.

Chase, et al., "Analysis of Pointers and Structures", Proceedings of the ACM SIGPLAN '90 Conference on Programming Language Design and Implementation, Jun. 20-22, 1990, 296-310, White Plains, NY.

Cohen, "Garbage Collection of Linked Data Structures", ACM, Computing Surveys, vol. 13, No. 3, Sep. 1981, 341-367.

Courtemanche, "MultiTrash, a Parallel Garbage Collector for MultiScheme", Thesis for MIT, 1986.

Courts, "Improving Locality of Reference in a Garbage-Collecting Memory Management System", Communications of the ACM, vol. 31, No. 9, Sep. 1988, 1128-1138.

Craig, et al., "nanoPortean: Scalable System Software for a Gigabit Active Router", IEEE INFOCOM 2001, 2001, 51-59.

Demers, et al., "Combining Generational and Conservative Garbage Collection: Framework and Implementations", In Conf. Rec. of 17th Annual ACM Symposium, Jan. 1990, 261-269, ACM Notices.

Doligez, et al., "Portable Unobtrusive Garbage Collection for Multiprocessor Systems", Association forComputing Machinery, 1994.

Endo, T., et al., "A Scalable Mark-Sweep Garbage Collector on Large-Scale Shared-Memory Machines", Proceedings of the 1997 ACM/IEEE Supercomputing 97 Conference, Nov. 15-21, 1997, San Jose, CA.

Halstead, "Implementation of Multilisp: Lisp on a Multiprocessor", MIT, Lab. for Computer Science, 1984, Cambridge.

Hickey, et al., "Performance Analysis of On-the-Fly Garbage Collection", Communication of the ACM, vol. 27, No. 11, Nov. 1984, 1143-1154.

Holzle, Urs, "A Fast Write Barrier for Generational Garbage Collectors", Workshop on Garbage Collection in Object Oriented Systems, Oct. 1993.

Hudak, et al., "Garbage Collection and Task Deletion in Distributed Applicative Processing Systems", ACM, 1982, 168-178.

Ichiyoshi, et al., "A Shared-Memory Parallel Extension of KLIX and Its Garbage Collection", Proceedings of GCS '94 Workshop on Parallel Logic Programming, 1994, 113-126.

Jones and Lins, "Garbage Collection: Algorithms for Automatic Dynamic Memory Management", 1996, 165-179, John Wiley and Sons, NY.

Karlsson, "Resume of Martin Karlsson, Internet Document, Online!, p. 1, line 22; line 27", <http://user.it.uu.se/(martink/> Retrieved on Oct. 30, 2002, May-Aug. 1999.

Massalin, et al., "A Lock-Free Multiprocessor OS Kernel, Dept. of Computer Science", Columbia University Technical Report No. CUCS-005-91, Jun. 19, 1991.

Moon, "Garbage Collection in a Large Lisp System", Conference Record of the 1984 ACM Symposium on LISP and Functional Programming, Aug. 1984, 235-246, Austin, TX.

Patel, et al., "A Model Completion Queue Mechanisms Using the Virtual Interface API", IEEE, 2000, 280-288.

Revesz, "Parallel Graph-Reduction With a Shared Memory Multiprocessor System", Proceedings of the International Conference on Computer Languages, Mar. 1990, New Orleans, LA.

Rudalics, "Distributed Copying Garbage Collection", ACM, 1986, 364-372.

Valois, "Lock-Free Data Structures, Internet Document: Doctor of Philosophy/Thesis, Online!, p. 27, line 13", .cs.rpi.edu/pub/caloisj/thesis.ps.gz, May 1995.

Washabaugh, et al., "Incremental Garbage Collection of Concurrent Objects", IEEE, 1990, 21-30.

Wilson, "Uniprocessor Garbage Collection Techniques", University of Texas, Date Unknown, Austin.

Youn, et al., "A Multithreaded Architecture for the Efficient Execution of Vector Computations within a Loop using", IEEE, 1996, 343-350.

Chuang, et al., "Real-Time Deques, Multihead Turing Machines, and Purely Functional Programming", ACM-FPCA '93, Jun. 1993, 289-298, Copenhagen, Denmark.

Endo, et al., "A Scalable Mark-Sweep Garbage Collector on Large-Scale Shared-Memory Machines", Dept. of Information Science, Uni. of Tokyo, Date Unknown, Japan.

Yamamoto, et al., "Comparing Reference Counting and Global Mark-and-Sweep on Parallel Computers", Dept. of Info. Science. University of Tokyo, Japan, Date Unknown, Japan.

\* cited by examiner

```
1    static java_lang_Object * popTop (localDeque *dq){
2         dequeAge oldAge = dq->age;
3         unsigned int localBot = dq->bot;
4         if (localBot == oldAge.top)
5              return NULL;
6         java_lang_Object * task = dq->objects[oldAge.top];
7         dequeAge newAge = oldAge;
8         if(++newAge.top==dq->physQdepth) newAge.top = 0;
9         dequeueAge tempAge = (dequeAge) casInt((int) newAge,
10                  (int) oldAge,
11                  (int*) &dq->age); /*atomic compare-and-swap*/
12        if(tempAge == oldAge)
13             return task;
14        return NULL;
15   }
```

FIG. 7

```
1    static void dequePush (localDeque *dq, java_lang_Object *obj) {
2         unsigned int localBot = dq->bot;
3         dequeAge oldAge = dq->age;
4         if (dequeNumberOfElements (localBot, oldAge.top, dq) == dq->physQdepth-1) {
5              dequeOverflow(dq);
6              localBot = dq->bot;
7         }
8         setArrayElement (localBot, dq, obj);
9         if (++localBot == dq->physQdepth) localBot = 0;
10        dq->bot = localBot;
11   }
```

```
1    static int dequeNumberOfElements(unsigned int localBot, unsigned int localTop,
2                  localDeque *dq) {
3         int diff = localBot - localTop;
4         if (diff < 0)
5              diff = diff + dq->physQdepth;
6         return diff;
7    }
```

```
1    static void setArrayElement(int index,
2              localDeque *dq,
3              java_lang_Object *obj) {
4         dq->objects[index] = obj;
5    }
```

FIG. 8

```
1   static java_lang_Object *dequePopWork (localDeque *dq) {
2       unsigned int localBot = dq->bot;
3       java_lang_Object *obj = NULL;
4       dequeAge oldAge, newAge;
5       int numElems = dequeNumberOfElements (localBot, dq ->age.top, dq);
6       if (numElems == 0)
7           return NULL;
8       if (numElems > dq->threshold) {
9           while ((obj == NULL) &&
10              (dequeNumberOfElements (localBot, dq->age.top, dq) > dq->threshold))
11          {
12              obj = popTop(dq)
13          }
14          if (obj != NULL)
15              return obj;
16      }
17      if(--localBot == -1) localBot = dq->physQdepth - 1;
18      dq->bot = localBot;
19      obj = getArrayElement (localBot, dq);
20      oldAge = dq->age; /* It might have changed */
21      if (dequeNumberOfElements (localBot, oldAge.top, dq) > 0) return obj;
22      newAge.tag = oldAge.tag + 1;
23      newAge.top = oldAge.top
24      if (localBot == oldAge.top) {
25          dequeAge tempAge;
26          tempAge = (dequeAge) casInt ((int) newAge,
27              (int) oldAge,
28              (int*) &dq->age);
29          if (tempAge == oldAge) return obj;
30      }
31      dq->age = newAge;
32      return NULL;
33  }

1   static void setArrayElement(int index,
2           localDeque *dq,
3           java_lang_Object *obj) {
4       dq->objects[index] = obj;
5   }
```

FIG. 9

DEGENERATE TREE

LIFO SEQUENCE
R
AB
ACD
ACEF
ACEGH
ACEGIJ
ACEGIKL
ACEGIKMN
ACEGIKM
ACEGIK
ACEGI
ACEG
ACE
AC
A

FIFO SEQUENCE
R
AB
B
CD
D
EF
F
GH
H
IJ
J
KL
L
MN
N

| LIFO SEQUENCE | FIFO SEQUENCE |
|---|---|
| R | R |
| AB | AB |
| AEF | BCD |
| AEMN | CDEF |
| AEM | DEFGH |
| AE | EFGHIJ |
| AKL | FGHIJKL |
| AK | GHIJKLMN |
| A | HIJKLMN |
| CD | IJKLMN |
| CIJ | JKLMN |
| CI | KLMN |
| C | LMN |
| GH | MN |
| G | N |

FIG. 15      FIG. 16

```
1   java_lang_Object *dequeFindWork(localDeque *dq) {
2       java_lang_Object *result = findWorkHelper(dq);
3       globalDeques *gdqs = dq->gdeques;
4       if (result == NULL) {
5           mark_self_inactive(dq->index, &gdqs->statusBitmap); /* You have no work */
6       }
7       while (result == NULL) {
8           if (!gdqs->statusBitmap) return NULL; /* No one has any work. Terminate. */
9           poll(NULL, NULL, 0);
10          if (checkForWork(dq)) { /* You don't have any work, but there is some either
11                      on the overflow queue, or in another thread's work
12                      queue */
13              mark_self_active(dq->index, &gdqs->statusBitmap); /* Looking for work */
14              result = findWorkHelper(dq);
15              if (result == NULL) {
16                  mark_self_inactive(dq->index, &gdqs->statusBitmap);
17              }
18          }
19      }
20      return result;
21  }
```

```
1   java_lang_Object *findWorkHelper(localDeque *dq) {
2       java_lang_Object *task = findWorkInOverflowList(dq);
3       if (task == NULL) {
4           task = stealWork(dq);
5       }
6       return task;
7   }
```

```
1   static void mark_self_inactive(int self, int *pStatusBitmap) {
2           int oldValue, newValue;
3           do {
4                   oldValue = *pStatusBitmap;
5                   newValue = oldValue & (~(1<<self));
6                   newValue = casInt(newValue, oldValue, pStatusBitmap);
7           } while (newValue != oldValue) ;
8   }
```

```
1   static void mark_self_active(int self, int *pStatusBitmap) {
2           int oldValue, newValue;
3           do {
4                   oldValue = *pStatusBitmap;
5                   newValue = oldValue | (1<<self);
6                   newValue = casInt(newValue, oldValue, pStatusBitmap);
7           } while (newValue != oldValue) ;
8   }
```

FIG. 17

```
1   static java_lang_Object *stealWork(localDeque *dq) {
2       globalDeques *gdqs = dq->gdeques;
3       int degree = gdqs->numDeques;
4       int iterations = 2 * degree;
5       int i = 0;
6       while (i++ < iterations) {
7           localDeque *dqToSteal = pickQueueToStealFrom(gdqs, dq);
8           if (dqToSteal->bot > dqToSteal->age.top) {
9               java_lang_Object *task = popTop(dqToSteal);
10              if(!task) poll(NULL, NULL, 0);
11              else return task;
12          }
13      }
14      return NULL;
15  }
```

FIG. 18

```
1   static bool_t checkForWork(localDeque *dq) {
2       globalDeques *gdqs = dq->gdeques;
3       return gdqs->classesWithWork || peekDeque(dq);
4   }
```

```
1   static bool_t peekDeque(localDeque *dq) {
2       globalDeques *gdqs = dq->gdeques;
3       int degree = gdqs->numDeques;
4       int i;
5       for (i = 0; i < 2 * degree; i++) {
6           localDeque *dqToPeek = pickQueueToStealFrom(gdqs, dq);
7           if (dqToPeek->bot > dqToPeek->age.top) {
8               return TRUE;
9           }
10      }
11      return FALSE;
12  }
```

FIG. 19

LOAD-BALANCING QUEUES EMPLOYING LIFO/FIFO WORK STEALING

CROSS-REFERENCE TO RELATED APPLICATIONS

This application is related to commonly assigned U.S. patent applications Ser. Nos. 09/892813 & 09/893264 of Nir N. Shavit et al. for Globally Distributed Load Balancing and Termination Detection for Shared-Memory Parallel Programs, both of which were filed on the same date as this application and are hereby incorporated by reference.

BACKGROUND OF THE INVENTION

1. Field of the Invention

The present invention is directed to computer processes that identify tasks dynamically. It particularly concerns maintaining lists of tasks thus identified.

2. Background Information

There are many types of computer operations that can be thought of as series of tasks. Sometimes some or most of the tasks to be performed are identifiable only dynamically. That is, some of the tasks can be identified only by performing others of the tasks. Examples of such tasks occur in what has come to be called "garbage collection." Garbage collection is the automatic reclamation of dynamically allocated memory. Byte code executed by a Java virtual machine, for instance, often calls for memory to be allocated for data "objects" if certain program branches are taken. Subsequently, a point in the byte-code program's execution can be reached at which there is no further possibility that the data stored in that dynamically allocated memory will be used. Without requiring the programmer to provide specific instructions to do so, the virtual machine executing the byte code automatically identifies such "unreachable" objects and reclaims their memory so that objects allocated thereafter can use it.

The general approach employed by the virtual machine's garbage collector is to identify all objects that are reachable and then reclaim memory that no such reachable object occupies. An object is considered reachable if it is referred to by a reference in a "root set" of locations, such as global variables, registers, or the call stack, that are recognized as being inherently reachable.

But an object is also reachable if it is referred to by a reference in a reachable object. So reachable-object identification is a recursive process: the identification of a reachable object can lead to identification of further reachable objects. And, if every reachable object so far identified is thought of as representing a further task, namely, that of identifying any further objects to which it refers, it can be seen that parts of the garbage-collection process include tasks that are only dynamically identifiable.

Now, a reachable object can contain references to more than one other object, and one or more of those may in turn contain multiple object references. So a list of objects (and thus tasks) identified in this fashion must be kept, and size to which such a list can grow is not knowable in advance. The list size is potentially prodigious, so the job of allocating space to the list can be correspondingly onerous.

SUMMARY OF THE INVENTION

We have devised a way of performing dynamically identified tasks that tends to reduce the list-size problem. Our approach arises from the recognition that the way the task list grows depends both on the order in which identified tasks are performed and on what can be thought of as the tasks' topology. As will be explained below, some topologies tend to result in significant list growth when the tasks are performed in a first-in, first-out ("FIFO") order but little or no list growth when the order is last in, first out ("LIFO"). Although the topology is not in general known a priori, a rough inference can be drawn from the rate of list growth. According to the invention, therefore, the task-performance order is LIFO in some circumstances and FIFO in others, the selection between the two being based on a mode-selection criterion.

BRIEF DESCRIPTION OF THE DRAWINGS

The invention description below refers to the accompanying drawings, of which:

FIG. 7 is a listing of a routine for popping entries from the top of a double-ended queue;

FIG. 8 is a listing of a routine for pushing entries onto the bottom of a double-ended queue;

FIG. 9 is a listing of a routine for popping entries alternately from the top and the bottom of a double-ended queue;

FIG. 15 is a diagram representing a sequence of task-queue contents that results from the FIG. 14 relationship when a LIFO task-selection policy is employed;

FIG. 16 is a diagram representing a sequence of task-queue contents that results from the FIG. 11 relationship when a FIFO task-selection policy is employed;

FIG. 17 contains listings of routines employed by the illustrated embodiment to locate tasks when its associated task queue is empty;

FIG. 18 is a listing of a routine that a thread in the illustrated embodiment employs to "steal" work from other threads' work queues; and FIG. 19 contains listings for routines that a thread in the illustrated embodiment employs to determine whether tasks are listed in overflow lists or other threads' work queues.

DETAILED DESCRIPTION OF AN ILLUSTRATIVE EMBODIMENT

Figure 1:
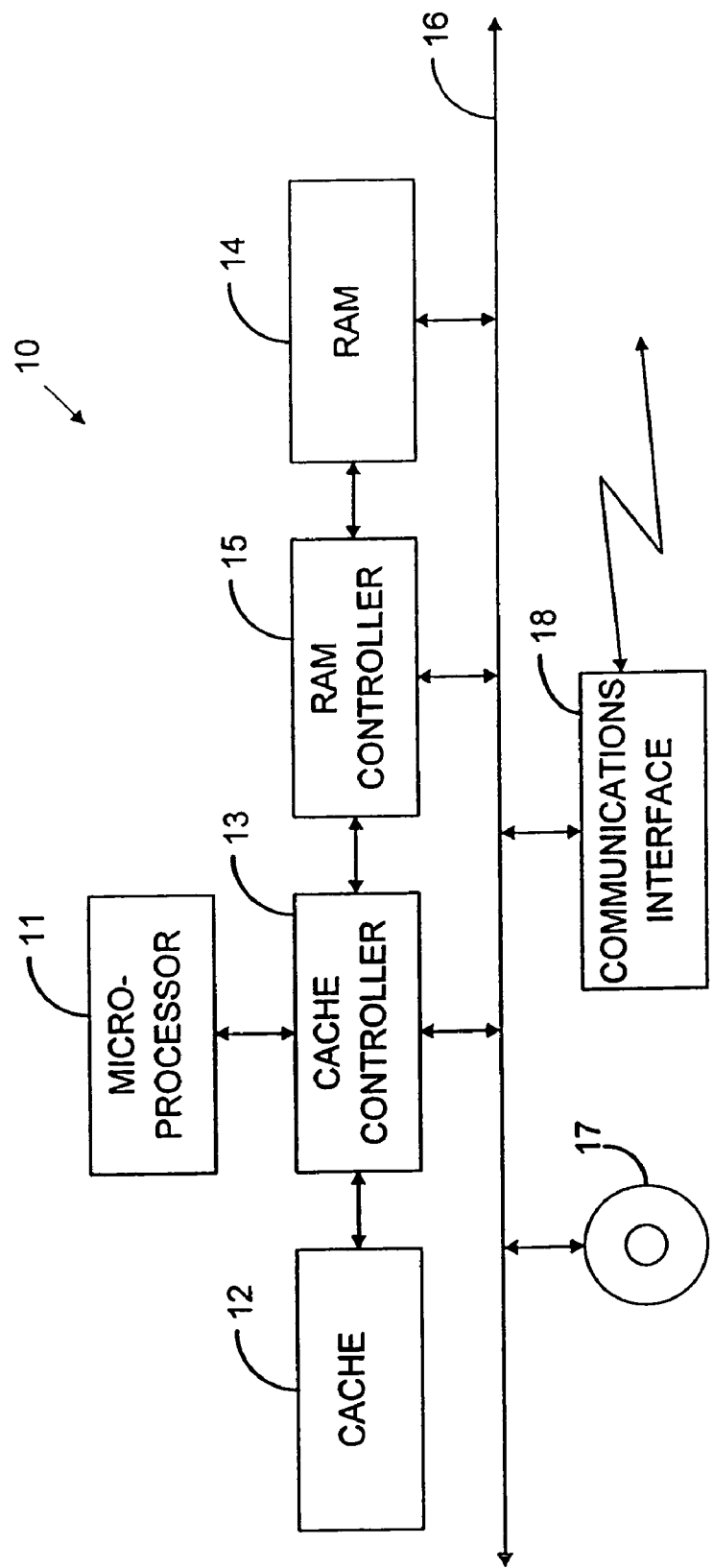
FIG. 1 is a block diagram of a typical uniprocessor computer system.

Although the present invention's teachings are applicable to a broad range of operations for performing dynamically identified tasks, the example below deals with tasks performed in a parallel-execution operation, where various execution "threads" perform different ones of the task list's tasks concurrently.

Modern computer systems provide for various types of concurrent operation. A user of a typical desktop computer, for instance, may be simultaneously employing a word-processor program and an e-mail program together with a calculator program. The user's computer could be using several simultaneously operating processors, each of which could be operating on a different program. More typically, the computer employs only a single main processor, and its operating-system software causes that processor to switch from one program to another rapidly enough that the user cannot usually tell that the different programs are not really executing simultaneously. The different running programs are usually referred to as "processes" in this connection, and the change from one process to another is said to involve a "context switch." In a context switch one process is interrupted, and the contents of the program counter, call stacks, and various registers are stored, including those used for memory mapping. Then the corresponding values previously stored for a previously interrupted process are loaded, and execution resumes for that process. Processor hardware and operating-system software typically have special provisions for performing such context switches.

A program running as a computer-system process may take advantage of such provisions to provide separate, concurrent "threads" of its own execution. In such a case, the program counter and various register contents are stored and reloaded with a different thread's value, as in the case of a process change, but the memory-mapping values are not changed, so the new thread of execution has access to the same process-specific physical memory as the same process's previous thread.

In some cases, the use of multiple execution threads is merely a matter of programming convenience. For example, compilers for various programming languages, such as the Java programming language, readily provide the "housekeeping" for spawning different threads, so the programmer is not burdened with handling the details of making different threads' execution appear simultaneous. In the case of multiprocessor systems, though, the use of multiple threads has speed advantages. A process can be performed more quickly if the system allocates different threads to different processors when processor capacity is available.

To take advantage of this fact, programmers often identify constituent operations with their programs that particularly lend themselves to parallel execution. When program execution reaches a point where the parallel-execution operation can begin, it starts different execution threads to perform different tasks within that operation.

Some of the benefits of employing multiple threads can be obtained in uniprocessor systems, of which FIG. 1 depicts a typical configuration. Its uniprocessor system 10 employs a single microprocessor such as microprocessor 11. In FIG. 1's exemplary system, microprocessor 11 receives data, and instructions for operating on them, from onboard cache memory or further cache memory 12, possibly through the mediation of a cache controller 13. The cache controller 13 can in turn receive such data from system read/write memory ("RAM") 14 through a RAM controller 15, or from various peripheral devices through a system bus 16.

The RAM 14's data and instruction contents, which can configure the system to implement the teachings to be described below, will ordinarily have been loaded from peripheral devices such as a system disk 17. Other sources include communications interface 18, which can receive instructions and data from other computer equipment.

Although threads are often employed in uniprocessor systems, they afford additional advantages in multiprocessor systems. Such systems come in a wide variety of configurations. Some may be largely the same as that of FIG. 1 with the exception that they include several microprocessors such as processor 11, possibly together with respective cache memories, sharing common read/write memory by communication over the common bus 16.

Figure 2:
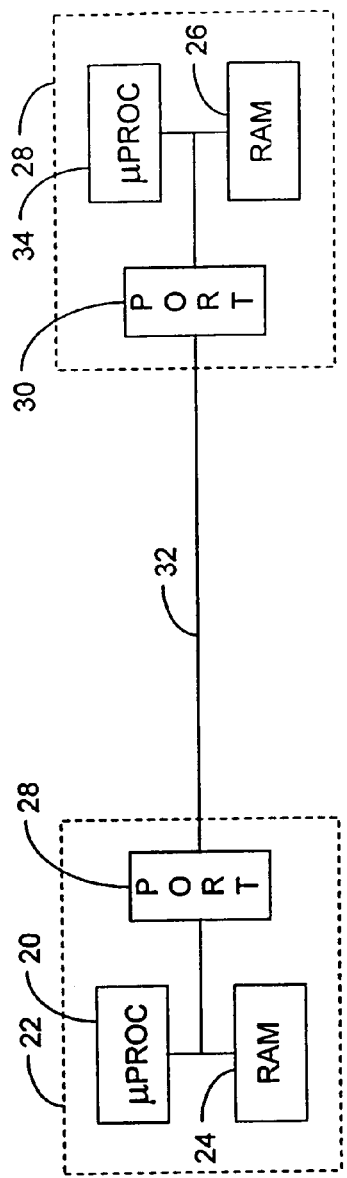
FIG. 2 is a block diagram of one type of multiprocessor computer system.

In other configurations, parts of the shared memory may be more local to one or more processors than to others. In FIG. 2, for instance, one or more microprocessors 20 at a location 22 may have access both to a local memory module 24 and to a further, remote memory module 26, which is provided at a remote location 28. Because of the greater distance, though, port circuitry 28 and 30 may be necessary to communicate at the lower speed to which an intervening channel 32 is limited. A processor 34 at the remote location may similarly have different-speed access to both memory modules 24 and 26. In such a situation, one or the other or both of the processors may need to fetch code or data or both from a remote location, but it will often be true that parts of the code will be replicated in both places. Regardless of the configuration, different processors can operate on the same code, although that code may be replicated in different physical memory, so different processors can be used to execute different threads of the same process.

To illustrate the invention, we will describe its use in keeping track of tasks in a parallel-execution operation performed by a garbage collector. To place garbage collection in context, we briefly review the general relationship between programming and computer operation. When a processor executes a computer program, of course, it executes machine instructions. A programmer typically writes the program, but it is a rare programmer who is familiar with the specific machine instructions in which his efforts eventually result. More typically, the programmer writes higher-level-language "source code," from which a computer software-configured to do so generates those machine instructions, or "object code."

Figure 3:
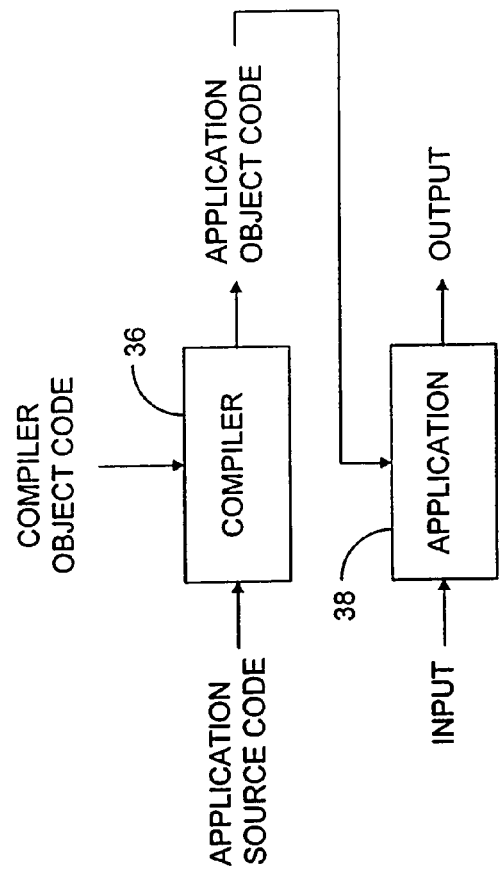
FIG. 3 is a block diagram that illustrates a relationship between source code and object code.

FIG. 3 represents this sequence. FIG. 3's block 36 represents a compiler process that a computer performs under the direction of compiler object code. That object code is typically stored on a persistent machine-readable medium, such as FIG. 1's system disk 17, and it is loaded by transmission of electrical signals into RAM 15 to configure the computer system to act as a compiler. But the compiler object code's persistent storage may instead be provided in a server system remote from the machine that performs the compiling. The electrical signals that carry the digital data by which the computer systems exchange the code are exemplary forms of carrier waves transporting the information.

In any event, the compiler converts source code into application object code, as FIG. 3 indicates, and places it in machine-readable storage such as RAM 15 or disk 17. A computer will follow that object code's instructions in performing the thus-defined application 38, which typically generates output from input. The compiler 36 can itself be thought of as an application, one in which the input is source code and the output is object code, but the computer that executes the application 28 is not necessarily the same as the one that executes the compiler application 36.

The source code need not have been written by a human programmer directly. Integrated development environments often automate the source-code-writing process to the extent that for many applications very little of the source code is produced "manually." As will be explained below, moreover, the "source" code being compiled may sometimes be low-level code, such as the byte-code input to the Java™ virtual machine, that programmers almost never write directly. (Sun, the Sun Logo, Sun Microsystems, and Java are trademarks or registered trademarks of Sun Microsystems, Inc., in the United States and other countries.) And, although FIG. 3 may appear to suggest a batch process, in which all of an application's object code is produced before any of it is executed, the same processor may both compile and execute the code. In such a case the processor may execute its compiler application concurrently with—and, indeed, in a way that can depend upon—its execution of the compiler's output object code.

So the sequence of operations by which source code results in machine-language instructions may be considerably more complicated than one may infer from FIG. 3. To give a sense of the complexity that can be involved, we discuss by reference to FIG. 4 an example of one way in which various levels of source code can result in the machine instructions that the processor executes. The human application programmer produces source code 40 written in a high-level language such as the Java programming language. In the case of the Java programming language, a compiler 42 converts that code into "class files." These predominantly include routines written in instructions, called "byte code" 44, for a "virtual machine" that various processors can be programmed to emulate. This conversion into byte code is almost always separated in time from that code's execution, so that aspect of the sequence is depicted as occurring in a "compile-time environment" 46 separate from a "run-time environment" 48, in which execution occurs.

Figure 4:
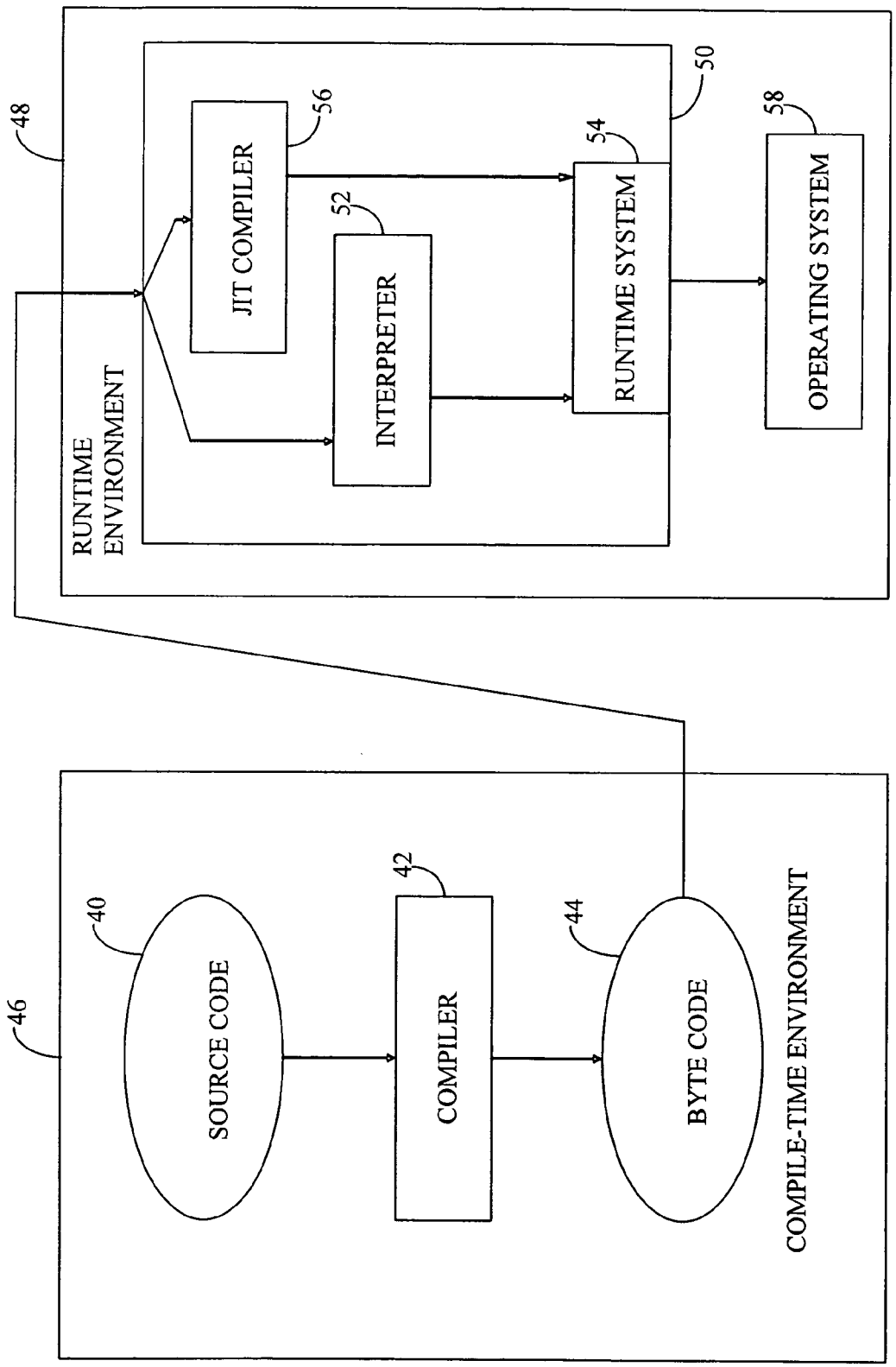
FIG. 4 is a block diagram of a more-complicated relationship between source code and object code.

Most typically, a processor runs the class files' instructions under the control of a virtual-machine program 50, whose purpose is to emulate a machine from whose instruction set the byte codes are drawn. Much of the virtual machine's action in executing the byte code is most like what those skilled in the art refer to as "interpreting," and FIG. 4 shows that the virtual machine includes an "interpreter" 52 for that purpose. The resultant instructions typically involve calls to a run-time system 54, which handles matters such as loading new class files as they are needed.

Many virtual-machine implementations also actually compile the byte code concurrently with the resultant object code's execution, so FIG. 4 depicts the virtual machine as additionally including a "just-in-time" compiler 56. It may be that the resultant object code will make low-level calls to the run-time system, as the drawing indicates. In any event, the code's execution will include calls to the local operating system 58.

Some implementations of the invention to be described below will be the automatic result of a compiler, interpreter, or some hybrid of the two, all of which we refer to below as "compiler/interpreters."

In addition to class-file loading, one of the functions that the runtime system performs is the garbage collection. The programming that performs this function can include parallel-execution operations, and it is by reference to such operations that we will illustrate the present invention's approach to performing dynamically identified tasks. In support of that discussion, we digress to a brief review of garbage-collection nomenclature.

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. An object may belong to a class, which is an organizational entity that may contain method code or other information shared by all objects belonging to that class. The specific example below by which we illustrate the present invention's more-general applicability deals with reclaiming memory allocated to Java-language objects, which belong to such classes.

A modem program executing as a computer-system process often dynamically allocates storage for objects within a part of the process's memory commonly referred to as the "heap." As was mentioned above, a garbage collector reclaims such objects when they are no longer reachable.

To distinguish the part of the program that does "useful" work from that which does the garbage collection, the term mutator is sometimes used; from the collector's point of view, what the mutator does is mutate active data structures' connectivity. Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object allocation includes steps for finding space occupied by objects whose reference count has fallen to zero. Obviously, such an approach can slow mutator operation significantly.

Other, "stop-the-world" garbage-collection approaches use somewhat less interleaving. The mutator still typically allocates an object space within the heap by invoking the garbage collector; the garbage collector keeps track of the fact that the thus-allocated region is occupied, and it refrains from allocating that region to other objects until it determines that the mutator no longer needs access to that object. But a stop-the-world collector performs its memory reclamation during garbage-collection cycles separate from the cycles in which the mutator runs. That is, the collector interrupts the mutator process, finds unreachable objects, reclaims their memory space for reuse, and then restarts the mutator.

Figure 5:
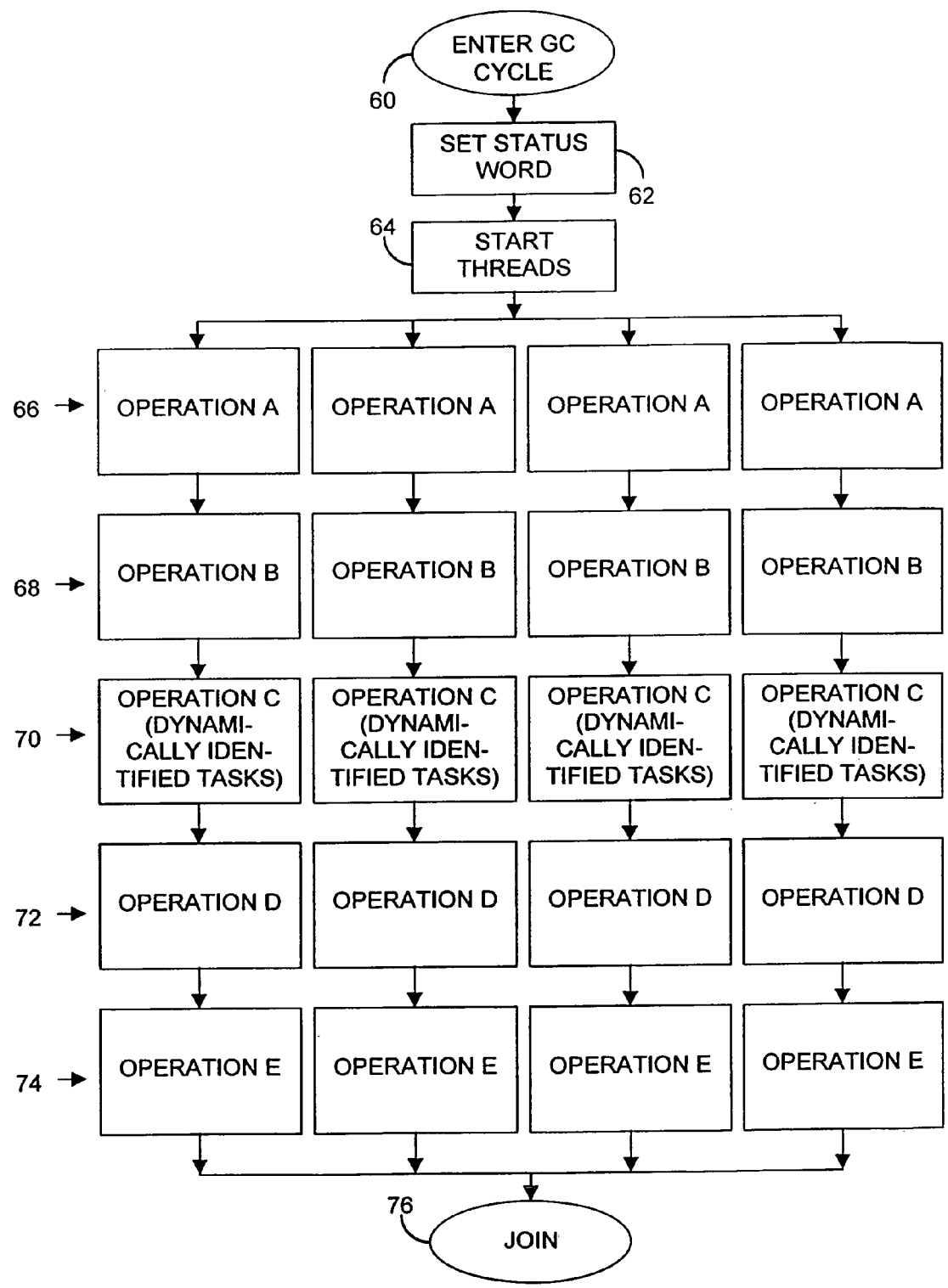
FIG. 5 is a flow chart that illustrates a sequence of parallel-execution operations.

To provide an example of a way in which the present invention's teachings can be applied, we assume a "stop-the-world" garbage collector and focus on the garbage-collection cycle. Since most of the specifics of a garbage-collection cycle are not of particular interest in the present context, FIG. 5 depicts only part of the cycle, and it depicts that part in a highly abstract manner. Its block 60 represents the start of the garbage-collection cycle, and its block 62 represents one of a number of the initial garbage-collection steps that are performed by a single thread only.

Eventually, the garbage collector reaches a part of its routine that can benefit from multi-threaded execution, and the virtual-machine programming calls upon the operating system to start a number of threads, as block 64 indicates, that will execute a subsequent code sequence in parallel. For the sake of example, we assume four threads. This would typically mean that the garbage collector is running in a multiprocessor system of at least that many processors, since the advantages of multithreading in an automatic-garbage-collection context are principally that different processors will at least sometimes execute different threads simultaneously.

Each of the threads executes an identical code sequence. The drawing depicts the code sequence somewhat arbitrarily as divided into a number of operations A, B, C, D, and E respectively represented by blocks 66, 68, 70, 72, and 74. These operations' specifics are not germane to the present discussion, but commonly assigned U.S. patent application Ser. No. 09/377,349, filed on Aug. 19, 1999, by Alexander T. Garthwaite for Popular-Object Handling in a Train-Algorithm-Based Garbage Collector and hereby incorporated by reference, gives an example of the types of garbage-collection operations that blocks 66, 68, 70, 72, and 74 may include.

Although all threads execute the same code sequence, some of the code's routines take the thread's identity as an argument, and some of the data that an instruction processes may change between that instruction's executions by different threads. These factors, together with hardware differences and the vagaries of thread scheduling, result in different threads' completing different operations at different times even in the absence of the dynamic task identification. For the sake of example, though, we assume that there is a point in the routine beyond which execution should not proceed until all threads have reached it, so the drawing includes a block 76 to represent a "join" mechanism for imposing this requirement. It is only after all threads reach the join point that further execution of the garbage-collection cycle can proceed.

Now, let us assume that FIG. 5's operation B involves essentially only statically identifiable tasks, whereas operation C involves tasks principally identifiable only dynamically. For example, assume that operation B involves processing the root set to find reachable objects. The root set may be divided into groups, and different threads may claim different groups to process. By performing those tasks, though, a garbage-collection thread dynamically identifies further tasks to perform. When operation B identifies an object referred to by the root set, that is, it has also identified the task of following the references in the thus-identified object to find further roots.

Figure 6:
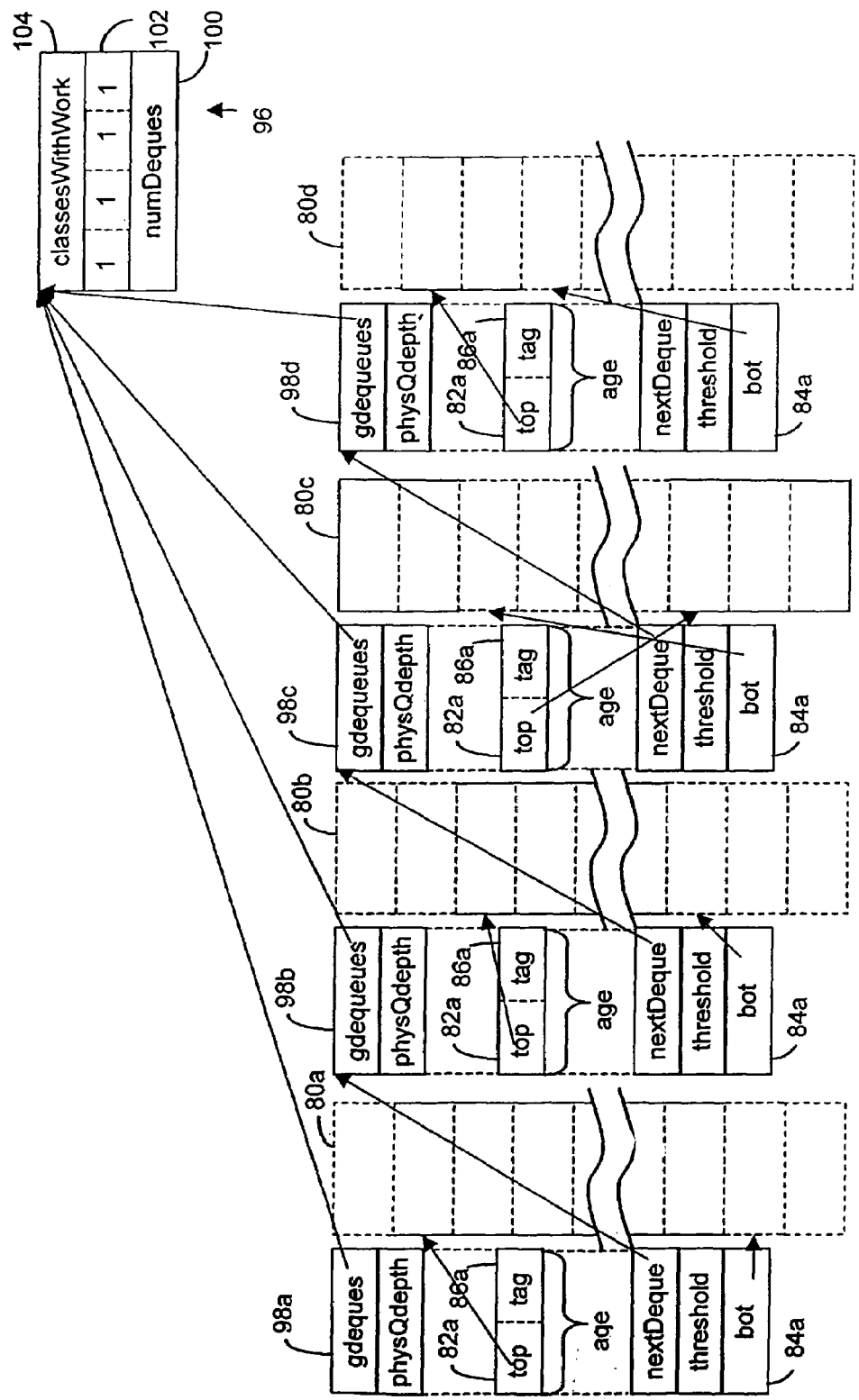
FIG. 6 is a block diagram illustrating work queues that an embodiment of the present invention may employ.

We will assume that operation C involves processing the reachable objects thus identified, so its tasks are identifiable only dynamically: since it is only by performing one of the tasks that further tasks are identified, the tasks are not known at the beginning of the operation. FIG. 6 illustrates work queues of a type that can be used to keep track of the tasks thus identified. Work queues 80*a, b, c,* and *d* are associated with respective threads. When a thread dynamically identifies a task, it places an identifier of that task in its work queue. In the case of operation C, i.e., reachable-object-identification and processing, a convenient type of task identifier to place in the work queue is a pointer to the reachable object that the garbage-collection thread has found. That pointer will represent the task of scanning the further object for references, relocating the object, performing necessary reference updating, etc.

Of course, other task granularities are possible. A separate entry could be made for each reference in a newly identified reachable object, for example.

As will be discussed further below, a garbage-collection thread performs the tasks in its work queue until that queue is empty, and it then searches other threads' queues for tasks to steal and perform, as will also be explained in more detail. The basic technique of employing dynamic-work-stealing queues is described in a paper by Nimar S. Arora et is al., entitled "Thread Scheduling for Multiprogrammed Multiprocessors," in the 1998 *Proceedings of the Tenth Annual ACM Symposium on Parallel Algorithms and Architectures*. A garbage-collection thread pushes newly found references onto one end of its work queue, which end is arbitrarily referred to as that work queue's bottom. When the thread is ready to perform a task from its queue, it will pop a reference 36 from the bottom of the queue and perform the represented task. When it is out of work, it "steals" work if possible from another thread's queue by popping a task from the other, "top" end of the other thread's queue.

One way of implementing queue control involves use of an index 82*a, b, c,* or *d* ("82") pointing to the next entry to be popped from the top of the queue and an index 84*a, b, c,* or *d* ("84") pointing to the location where the next entry should be added to the bottom of the queue. For reasons to be explained below, the memory word (referred to as "age" in the code discussed below) that contains the top index also includes a tag 86*a, b, c,* or *d* ("86"). The garbage-collection thread associated with the queue increments the bottom index when it pushes a task identifier onto its queue, and it decrements that index when it pops an identifier from it. A stealing thread increments the top index when it pops an identifier from another thread's queue. (Of course, the directions of queue growth and contraction are arbitrary; the queue could instead be so arranged that, for example, bottom pushing and top popping are accompanied by index decrementing rather than incrementing.)

FIG. 7 sets forth simplified sample code for a routine, popTop( ), that a stealing thread could use to pop a task from another thread's queue. That routine involves the tag field. Before we explain that field's purpose, though, we will first consider in detail how the step of popping the queue from the top is performed.

To steal from the top of another thread's work queue, the stealing thread first reads that queue's top index as part of the "age" value, as popTop( )'s second line indicates, to find its top entry's location. As the third line indicates, the stealing thread then reads the bottom index to make sure that the bottom index is not less than or the same as the top index, i.e., that the queue is not empty. As the fourth and fifth lines indicate, the stealing thread will not pop the queue if the queue is empty.

Otherwise, the stealing thread reads the top-index-identified queue entry, as the sixth line indicates. As the seventh line indicates, it then makes a second local copy, newAge, of the queue's previously read "age" field, and, as the eighth line indicates, it circularly increments that copy's "top" subfield. (Although task-queue accesses are circular in the illustrated embodiment, other embodiments may access them monotonically.) But the stealing thread does not immediately perform the task that the queue entry identifies. This is because, after it has read the top index, a second stealing thread may pop the top entry after the first stealing thread has read the location to which the top entry points but before it increments the top index to indicate that it has claimed the task. If that happens, the first stealing thread could end up attempting to process an object that the second thread had already processed, and the next object in the list would be skipped entirely.

So, before it actually performs that task, the stealing thread performs an atomic compare-and-swap operation, as the ninth through eleventh lines indicate. In this operation, it effectively pops the top queue entry by circularly incrementing the top index 82 if that index's value is still the same as the one the stealing thread used to read the top queue entry, i.e., if no other thread popped the queue in the interim. As the eleventh line in particular indicates, the storing operation is actually performed on the entire age word, i.e., on the entire word that contains both the top index 82 and the tag 84, rather than only on the top field, for reasons that will be explained in due course. If the stealing thread thereby successfully pops the queue, i.e., if the absence of a top-index-value change as determined by the compare-and-swap operation's comparison has enabled that thread to claim the task by incrementing the top index in that atomic operation's resultant swap, then the twelfth line's test will yield a positive result, and the thread proceeds to perform the task whose identifier the popTop( ) routine returns at that routine's thirteenth line.

If the top index has changed, on the other hand, then another thread has presumably already popped the queue entry. As the fourteenth line indicates, the routine returns a NULL value in that case, and the first stealing thread concludes from the NULL return value that it has not popped the top entry successfully. In short, an interim change in the top index causes the routine not to increment the top index (as part of the compare-and-swap operation) and, because of the NULL return value, prevents the executing thread from performing the task that the initially read queue entry represents.

Thus employing an atomic compare-and-swap operation protects the pop operation's integrity from interference by other stealing threads. Without the tag field, though, the top-popping operation would still be vulnerable to interference from the (bottom-popping) owner thread. To understand why, first consider how the owner thread pushes queue entries.

Unlike stealing threads, the owner thread pushes entries, doing so at the queue's bottom, and it pops entries from the bottom rather than the top when it operates in a LIFO mode. (As will presently be explained, it may also operate in a FIFO mode, in which it pops from the top.) As FIG. 8's simplified sample code illustrates, pushing a queue entry begins with reading the queue's "bot" and "age" fields, as the dequePush( ) routine's second and third lines indicate. As the fourth through seventh lines of that routine's listing indicate, appropriate action explained in more detail below is then taken to make room in the queue if it is full. Then the task identifier is placed in the queue, as the eighth line indicates, and the queue's bottom index, "bot," is circularly incremented, as the listing's ninth and tenth lines indicate. Since the owner thread is the only thread that pushes onto the queue, and, as FIG. 7's fourth and fifth lines indicate, a stealing thread will not pop an entry from the queue position identified by the bottom index, there is no need to take special precautions against interference by other, stealing garbage-collection threads, when the owner thread thus pushes a task identifier onto the task queue.

But the owner thread's popping an entry from the bottom of the queue does require such precautions. Although a stealing thread pops the top only, the top and the bottom entries are the same when there is only one entry left. FIG. 9 sets forth a simplified example of a routine, dequePopWork( ), that illustrates how an appropriate precaution can be taken.

That routine is called by a task queue's "owner" thread to retrieve the identifier of the next task to be performed. As the dequePopWork( ) listing's fifth through seventh lines indicate, that routine returns a NULL value if the queue has no task identifiers left. The owner thread responds to this empty-queue-indicating NULL return value by attempting to find work elsewhere. If the queue is not empty, on the other hand, the routine applies a mode-selection criterion to determine whether a LIFO mode or a FIFO mode should be used to pop a task identifier from the queue, i.e., whether the task identifier should be popped from the queue's bottom or its top.

The criterion and rationale for making this determination will be discussed below. But we will assume for the moment that the eighth line's application of the mode-selection criterion results in a determination that the LIFO mode should be employed. This results in the routine's skipping the FIFO block, which is set forth in the ninth through sixteenth lines, and instead beginning the LIFO block. That block begins with the seventeenth-through nineteenth-line steps of circularly decrementing the queue's bottom-indicating "bot" field and reading the task-identifier contents of the queue location thereby identified.

Unlike the top-index incrementing that a stealing thread performs in the step represented by FIG. 7's ninth through eleventh lines, though, this index change does not mean that the index-changing thread will necessarily perform the task thereby "claimed." True, decrementing the bottom index does prevent the task whose identifier the owner thread reads in FIG. 9's nineteenth line from being popped by a stealing thread—if that stealing thread has not reached the step that FIG. 7's third line represents. But a stealing thread that has already passed that step may have popped that task.

The dequePopWork( ) routine therefore checks for this possibility. As FIG. 9's twentieth and twenty-first lines indicate, dequePopWork( )'s determination of whether any task identifiers remain is based on the (now-decremented) bottom index, which identifies the queue location from which it read the entry, and the top, next-steal-location-indicating index as it stood after bottom index was decremented. As the twenty-first line indicates, dequePopWork( ) returns the task identifier to the owner thread's calling routine if the result is an indication that task identifiers remain, and the owner thread proceeds is with the task thus identified.

Otherwise, the thus-identified task may or may not have been stolen, and dequePopWork proceeds in a fashion that depends on whether it has. One thing is certain, though: its identifier was the last one in the queue, and either the current execution of dequePopWork( ) will pop that last task or a stealing thread has done so already.

As the twenty-second and twenty-third lines indicate, it forms a word, newAge, whose "top" field is the same as the top field read as part of the queue's age value in the twentieth-line step and, for reasons shortly to be explained, whose "tag" field is one greater than the tag field read as part of that value. If the originally read top and decremented bottom indexes are not equal, the routine can be sure at this point that a stealing thread has indeed popped that last entry, so it tests their equality in the step that the twenty-fourth line represents. If they are not equal, then the queue location identified as next to be stolen from has advanced beyond the one from which the bottom-popping routine read the task identifier it its nineteenth line: a stealing thread has already popped the task identified by that task identifier. The routine therefore skips the block represented by the twenty-fourth through thirtieth lines, proceeding to the thirty-first line's step of setting the queue's age value to newAge and, as the thirty-second line indicates, returning a NULL value to its caller. The NULL value tells the owner thread that no work is left in the queue, so that thread does not attempt to perform the task identified by the entry that dequePop-Work( ) read in its nineteenth-line step.

If the result of the twenty-fourth-line test is positive, on the other hand, then dequePopWork( ) can conclude that the identified task had not yet been stolen when it read the task identifier from the queue in its nineteenth-line step. But that task may have been stolen in the interim. The routine performs the twenty-sixth through twenty-eighth lines' atomic compare-and-swap operation. That operation swaps the contents of queue's (top-index-containing) age word with those of newAge, which has an incremented tag field, if and only if a comparison performed before and atomically with the swap indicates that the age word has not changed since it was read and thus that no other thread has incremented the age word's top field in the interim. The swap therefore occurs successfully only if, when the swap occurs, the queue's top index still indicates that the location from which the routine read the task identifier is yet to be stolen from.

As the twenty-ninth line indicates, the routine then determines whether the swap was successful. If it was, then no steal occurred, and none will. So it returns the identifier of a task, which the owner thread will accordingly perform. If the swap was unsuccessful, then another thread must have stolen the task. So the routine gives the age word newAge's value, as the thirty-first line indicates, and, as the thirty-second line indicates, returns a NULL value to indicate that it found the queue empty.

We now turn to the reason for the tag field. Consider a situation in which an owner has pushed a task onto its queue, popped that task, and pushed another task onto its queue. Now assume that another thread concurrently begins an attempt to steal the first task pushed onto the queue. Further assume that the owner thread does two things after the stealing thread has performed FIG. 7's second-, third-, and sixth-line steps of reading the indexes and task identifier but before it reaches the ninth-line step of atomically claiming the task by incrementing the top index if that index has not changed since it was read in the second-line step. Specifically, assume that during that time the owner both (1) pops the task whose identifier the stealing thread read and (2) pushes a new task onto the queue to replace it.

The result is that, when the stealing thread's top-popping routine of FIG. 7 reaches the comparison part of the compare-and-swap operation in its ninth through eleventh lines, the top-index value will have returned to the value it had when the top-popping routine read it in its second-line step. So, if the queue's age field were simply the top index, without the additional, tag field, the compare-and-swap operation would succeed, and the stealing thread would perform the task whose identifier the top-popping operation read, even though the owner thread had already claimed that task. Moreover, because of the eighth-line step of circularly incrementing the top index, the task that the stealing thread should have stolen instead would thereafter be skipped. And this would happen not only in that single-entry situation but also in any situation in which the queue gets emptied if other threads additionally steal enough tasks to return the top index to its previous value.

As FIG. 9's twenty-second and twenty-third lines indicate, though, the owner thread prevents this by incrementing the tag field. So, when the stealing thread performs the comparison part of the top-popping routine's compare-and-swap operation represented by FIG. 7's ninth through eleventh lines, it detects the interfering activity because the age value's tag field has changed. The stealing thread therefore does not perform the already-claimed task.

We now return to the dequeOverflow( ) call in the fifth line of FIG. 8's dequePush( ) listing. As was mentioned above, this call occurs if the queue onto which an identifier is to be pushed is full. The drawings do not set forth explicit code for dequeoverflow( ), but a thread that executes it first employs an appropriate locking mechanism to obtain temporary exclusive access to a common overflow data structure, FIG. 10's structure 90. With the common overflow data structure thus "locked," the thread moves identifiers one at a time from the bottom of its queue to an overflow list to which, as will be explained presently, that structure points. Preferably, the thread removes half of the identifiers from its queue and allows the other half to remain.

The overflow data structure is a table in which each entry includes a class identifier 92 and a list pointer 94. The list pointer points to a corresponding linked list of objects representing tasks in the overflow list. To add a task-representing object to the overflow list, the thread determines the object's class by reading the class pointer that most object-oriented languages place in an object data structure's header. If the overflow data structure already contains an entry that represents that object's class, the thread adds the task at the head of the corresponding list. It does so by placing the list-field contents of the class's overflow-data-structure entry into the object's erstwhile class-pointer field (labeled "next" in the drawing to indicate its new role as a pointer to the next list element) and placing in that list field a pointer to the added object. (The overflow objects are listed by class so that during retrieval the proper class pointer can be re-installed in each object's header.)

If the overflow data structure 90 does not already contain an entry that represents the object's class, the thread adds such an entry to that structure and places the task-representing object at the head of the associated list by making the added entry's list-field contents point to that object. The thread also NULLs the erstwhile class-pointer field in the object's header to indicate that it is the last member of its class's linked list of over-flowed tasks.

When a thread has exhausted its queue, it determines whether the overflow data structure has any objects in its lists. If not, it attempts to steal from other threads' work queues. Otherwise, the thread obtains a lock on the overflow data structure and retrieves one or more objects from one or more of its lists. In doing so, the thread restores each retrieved object's class pointer and re-links remaining objects as necessary to maintain the overflow lists. The retrieved objects are pushed onto the bottom of the queue. Although the number of objects retrieved as a result of a single queue exhaustion is not critical, it is advantageous for a thread to retrieve enough to fill half of its queue space. Then, if its queue subsequently overflows and it removes half from that queue as suggested above, the retrieved objects will be in the top half of the queue, so those retrieved objects will not be placed on an overflow list again.

Figure 10:
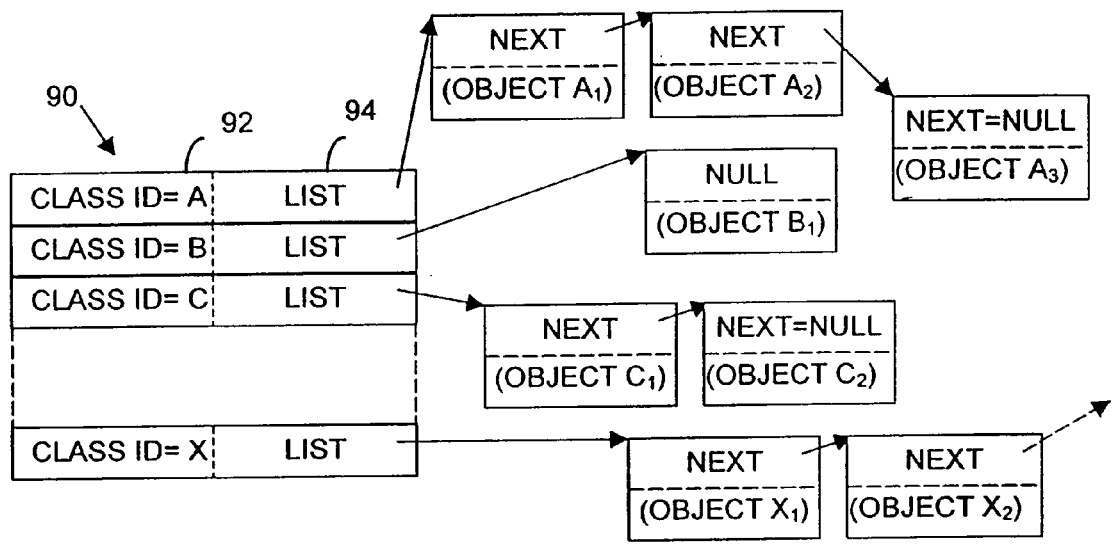
FIG. 10 is a block diagram of data structures employed by some embodiments of the present invention to implement overflow lists.

Although FIG. 10 depicts the overflow data structure 90 as a compact table, the overflow data structure may be provided efficiently by storing a pointer to a class's list of overflow objects directly in the class data structure and maintaining the set of classes where overflow lists are non-empty as a linked list of class data structures threaded through a class-data-structure field provided for that purpose. For the sake of convenience, we will assume this approach in the discussion of the illustrated embodiment's approach to termination detection. Before we deal with that, though, we consider the way in which the present invention chooses the sequence in which it executes the dynamically identified tasks.

Now, it is apparent from the foregoing description that the overflow mechanism is somewhat time-consuming. Employing this mechanism is acceptable, though, if the system does not need to resort to it too frequently. And, if the task queues are made relatively large, it will not. But there is usually a practical limit to how large the queues can be. The present invention tends to reduce the queue size required. As will be explained presently, it does so by adapting the task-execution sequence to the types of reference relationships there are among the dynamically identified tasks.

Figures 11, 12, 13:
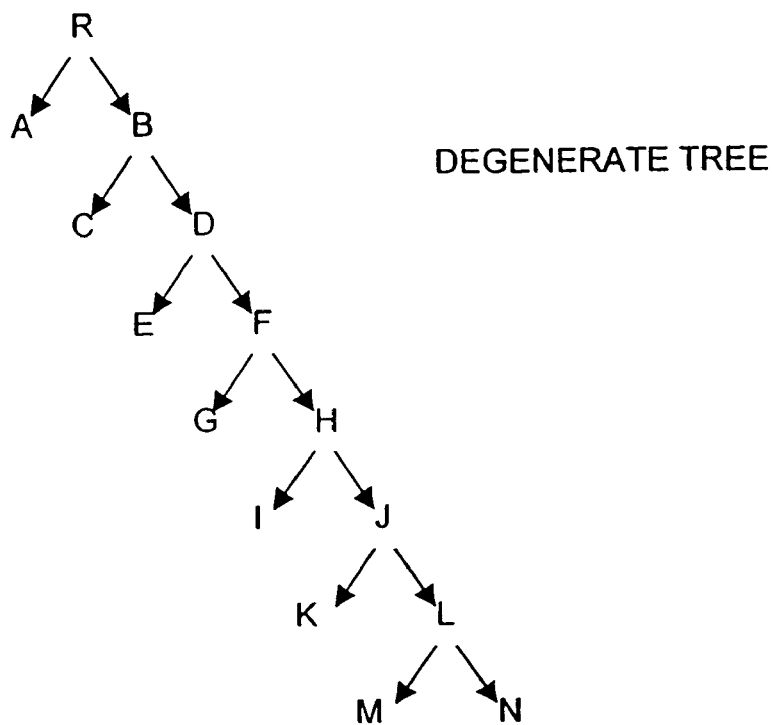
FIG. 11 is a topological diagram representing an illustrative relationship among dynamically identified tasks.
FIG. 12 is a diagram representing a sequence of task-queue contents that results from the FIG. 11 relationship when a LIFO task-selection policy is employed.
FIG. 13 is a diagram representing a sequence of task-queue contents that results from the FIG. 11 relationship when a FIFO task-selection policy is employed.
Figure 14:
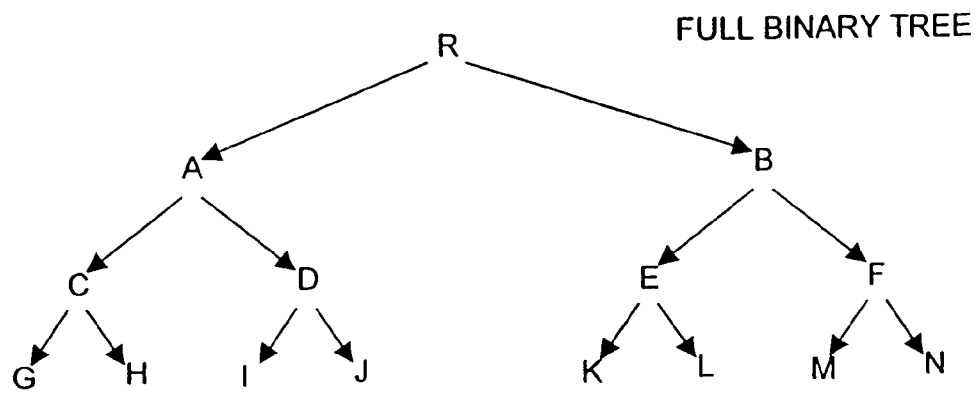
FIG. 14 is a topological diagram representing a different illustrative relationship among dynamically identified tasks.

To appreciate how the optimal sequence of task executions depends on the relationships among those tasks, consider FIGS. 11–16. FIG. 11 represents those relationships as a tree. Each node represents a task, and edges leading from a given node lead to nodes that represent tasks identified by performance of the task associated with the given node. Node R represents a single, root task, and performance of that task results in identifying tasks that nodes A and B represent. In the case in which the operation being performed is that of identifying reachable objects, that is, nodes A and B can be thought of as representing objects to which the root object R contains a reference.

In the reference topology that FIG. 11 represents, the object corresponding to node A contains no references, but the object corresponding to node B contains two, namely, to the objects that nodes C and D represent. Similarly, the objects corresponding to nodes E, G, J, and I contain no references, while the objects corresponding to nodes D, F, and H contain two apiece. We think of this topology as a degenerate tree.

FIG. 12 represents the resultant contents of a task queue after successive task executions if the tasks are selected for execution in a last-in, first-out ("LIFO") manner. As that table shows, the task queues become quite deep, reaching eight entries at one point even though the total number of tasks to be performed is only fifteen. In contrast, FIG. 13 shows the content sequence that results when the task sequence is selected in a first-in, first-out ("FIFO") manner. In that case, the total number of queue entries never exceeds two. So a FIFO policy results in a lower likelihood of queue overflow when the relationship topology is similar to the one that FIG. 11 depicts.

But other relationship topologies favor another policy. Consider the topology of FIG. 14, for instance. In that topology, all of the objects other than those represented by leaf nodes have references to two objects. FIG. 15 represents the queue-content sequence that results from a LIFO policy, and it shows that the number of entries never exceeds four, despite the relatively dense relationship tree. In contrast, a FIFO policy, which FIG. 16 illustrates, causes the maximum number of entries to be twice that amount. For FIG. 14's full binary tree, that is, it is the LIFO policy that is preferable, not the FIFO policy, which is preferable for the FIG. 11 topology.

The present invention is based on the just-demonstrated fact that different relationship topologies make different task-selection-sequence policies preferable. According to the present invention, the queue's owner thread switches between a LIFO policy and a FIFO policy in accordance with some mode-selection criterion.

Although some mode-selection criteria will undoubtedly prove preferable to others, the particular criterion chosen is not central to the present invention's teachings, so the dequePopWork( ) routine of FIG. 9 employs a very simple one. Specifically, that routine defaults to a LIFO policy, but it switches to a FIFO policy if, as determined in its listing's eighth line, the number of entries in the queue exceeds a threshold value. (In the illustrated embodiment, the threshold is one associated with the particular queue and contained in that queue's data structure, but some embodiments will no doubt employ a different arrangement, such as a global threshold value.) As that listing's eighth through sixteenth lines indicate, dequePopWork( ) simply calls FIG. 7's top-popping routine, and thereby pops the first in of the queue's remaining task identifiers, if that threshold is exceeded.

As was explained above, popTop( ) can return a NULL value, so dequePopWork( ) keeps calling that routine until either (1) it thereby is returned a non-NULL task identifier or (2) the queue's number of entries no longer exceeds the threshold value. In the former case, dequePopWork( ) returns popTop( )'s return value, while it returns to a LIFO policy in the latter case by proceeding to pop from the bottom.

The criterion imposed in the illustrated embodiment is simple and readily implemented, but it is not the only one that embodiments of the present invention may employ. Although the illustrated embodiment employs LIFO as a default and FIFO when the queue gets too full, an alternative approach could be to toggle the mode in accordance with the queue's behavior. For example, LIFO could be used independently of queue size until an overflow occurs. FIFO would then prevail until a further overflow occurs, at which time the mode would toggle back to LIFO. As another example, the queue could be tested on, say, every tenth pop operation for a change in the number of entries, and the mode could be toggled if the change exceeds a predetermined limit. Other criteria for triggering a mode change could also be used.

To complete the illustrated embodiment's description, we now turn to the way in which the illustrated embodiment determines whether it has completed the parallel-execution operation. When an owner thread's execution of FIG. 9's work-popping routine produces a NULL return value, indicating that the thread's queue has been exhausted, the thread attempts to find tasks identified by other sources. And it continues doing so until it either (1) thereby finds a further operation-C task to perform or (2) concludes that no more such tasks remain. In the example scenario, it can then move on to operation D.

FIG. 17 sets forth in simplified code an example of how a thread can search for further work and determine whether any more exists. As will presently be explained in more detail, an executing thread that has exhausted its own work queue in the illustrated embodiment calls FIG. 17's deque-FindWork( ) routine, passing that routine a pointer to the work queue of which it is the owner. If dequeFindWork( ) returns a NULL value, the executing thread concludes that no further operation-C tasks remain, and it presses on to operation D. If dequeFindWork( ) returns a non-NULL task identifier, on the other hand, the executing thread performs the task thereby identified. The executing thread may push further tasks onto its work queue in the course of performing that task, and, as will be explained below, dequeFind-Work( ) may have pushed task identifiers onto the executing thread's work queue in the course of finding the task identifier that it returns. So the executing thread returns to popping task identifiers from its own work queue after it has performed the task whose identifier dequeFindWork returns.

In FIG. 17, dequeFindWork( )'s second line shows that its first step is to call a helper routine, findWorkHelper( ), which FIG. 17 also lists. This routine is what attempts to find tasks identified in locations other than the executing thread's work queue. Since the illustrated embodiment limits its work-queue memory space and uses overflow lists as a result, the helper routine looks for task identifiers in any overflow lists. The subroutine call in findWorkHelper( )'s second line represents this search. If the findWorkInOverflowList( ) routine (whose code the drawings omit) is successful in retrieving task identifiers, its return value, as well as those of the helper routine and of dequeFindWork( ) itself, is one of them.

If findWorkInOverflowList( ) is unsuccessful, it returns a NULL value. As the helper routine's third and fourth lines indicate, the helper routine responds to such a NULL return value by trying to steal a task from another thread's work queue. Now, perusal of FIG. 7's top-popping routine reveals that the illustrated embodiment permits interference from other threads to cause a steal attempt to fail even if the queue contains plenty of task identifiers. To minimize the likelihood that any such interference will occur systematically, the work-stealing routine that FIG. 17's helper routine calls in its fourth line may use the probabilistic approach to stealing that FIG. 18 sets forth.

The stealWork( ) routine that FIG. 18 lists assumes a common data structure of which FIG. 6's structure 96 shows a few fields of interest. The work-queue data structures are assumed to include pointers 98 to this common data structure, which FIG. 18's second line refers to as being of the "globalDeques" data type. Among that structure's fields is a field 100 that tells how many individual-thread work queues there are. As stealWork( )'s third and fourth lines indicate, it sets a loop-iteration limit to, in this example, twice that number.

As will now be explained in connection with stealWork( )'s fifth through thirteenth lines, that routine either succeeds in stealing from another work queue or gives up after making a number of attempts equal to the loop-iteration limit. On each attempt, it makes its seventh-line call to a subroutine (whose code the drawings omit) that randomly chooses a queue other than the one associated with the executing thread, and it tries to steal a task from that queue, as its eighth and ninth lines indicate. If the top-popping routine called in the ninth line fails, the illustrated embodiment also makes the tenth line's system call to terminate the thread's current execution-time slice in favor of any threads that are waiting for processor time.

If the number of repetitions of the loop of FIG. 18's sixth through thirteenth lines reaches the loop-repetition limit without successfully stealing a task, the stealWork( ) routine returns a NULL value, as its fourteenth line indicates, and so does FIG. 17's findWorkHelper( ) routine, as its fourth and sixth lines indicate.

Now, a review of, for instance, FIG. 18's stealWork( ) routine reveals that in the illustrated embodiment a thread can "give up" on seeking work in other threads' work queues—and its execution of that routine therefore produce a NULL return value—even in some situations in which one or more of the other queues do contain remaining task identifiers. Allowing the thread to go on to the next operation when it has thus failed to find other work could result in a serious work imbalance.

Indeed, such an imbalance could result even if the operation instead used a work-stealing routine that would not give up until all queues are empty. Suppose, for example, that a thread moves on to the next operation because all work queues are empty, but when it does so one or more other threads are still processing respective tasks. Since the operation that it is leaving is one that identifies tasks dynamically, there could actually be a large number of (as yet unidentified) tasks yet to be performed. The thread that failed to find work in the other threads' queues (and, in the illustrated example, in the overflow lists) would then be leaving much of that operation's tasks to the other threads rather than optimally sharing those tasks.

To prevent this, the illustrated embodiment employs FIG. 6's status word 102. This word includes a separate (typically, single-bit) field corresponding to each of the threads. The steps represented by FIG. 5's block 62 include initializing that word's contents by setting all of those fields to a (say, binary-one) value that represents what we will call an active thread state. When FIG. 18's stealWork( ) routine fails to steal work and as a result causes a NULL return value from the FIG. 17 dequeFindWork( ) routine's second-line call of the findWorkHelper( ) routine, dequeFindWork( ) makes its fifth-line call of a routine that changes status word 102's value. That fifth-line subroutine atomically resets the executing thread's field in that word to an inactivity-indicating value of, say, a binary zero. (We use the term word in "status word" because the status word in almost every implementation be of a size that can be accessed in a single machine instruction. This is not an essential part of the invention, but the field resetting does have to be performed in such a way as not to affect other fields, and it has to be possible to read the status "word" in an atomic fashion.)

The dequeFindWork( ) routine then enters a loop that its seventh through nineteenth lines set forth. This loop repeatedly looks for further work, in a way that will be explained shortly. When it finds work, it leaves the loop, as the seventh line indicates, with the result that the dequeFindWork( ) routine returns the thereby-found task's identifier. So, if the loop finds work, the executing thread performs the task and returns to attempting to pop task identifiers from its own queue until it again exhausts that queue and returns to dequeFindWork to find work again in other locations. In the illustrated scenario, that is, the thread continues to work on FIG. 5's operation C.

The only way in which the thread can leave that operation is for every field of FIG. 6's status word 102 to contain the inactivity-indicating value, i.e., for the illustrated embodiment's status word to contain all zeroes. As was just explained, no thread can set its status field to indicate inactivity while its queue has work. Moreover, a queue places work in the overflow lists only when it has work in its queue, and, when it exhausts its queue, it checks the overflow lists before it marks itself inactive. So no thread can leave the operation unless all of its tasks have been completed.

If the status word does not indicate that all work has been completed, the dequeFindWork( ) routine checks for work. Some embodiments may reduce the loop frequency by, as the illustrated embodiment illustrates in its ninth-line step, first allowing any threads waiting for execution time to be accorded some. In any event, dequeFindWork( ) then checks for further work by calling checkForWork( ), as its tenth line indicates.

FIG. 19 sets forth the checkForWork( ) routine. As that routine's third line indicates, it determines whether there is a non-NULL value in FIG. 6's common classesWithWork field 104, which is the pointer to the linked list of class structures whose overflow lists contain at least one task identifier each. If there are no task identifiers in overflow lists, the classesWithWork field contains a NULL value.

If the classesWithWork field does contain a NULL value, that third-line step also calls peekDeque( ). As FIG. 19 shows, the peekDeque( ) routine repeatedly chooses other threads' queues at random, just as FIG. 18's stealWork( ) routine does. Instead of claiming any work thereby found, though, it merely returns a Boolean value that indicates whether it found work in the other queues. So the return value produced by the checkForWork( ) routine's third-line step indicates whether work was either in the overflow lists or in the other threads' work queues, and this is the value that is returned to FIG. 17's dequeFindWork( ) routine in that routine's the tenth line.

But the dequeFindWork( ) routine does not claim the thereby-discovered task for the executing queue, at least not immediately. If it did claim a task while its field in FIG. 6's common status word 102 contained an inactivity-containing value, other threads would neither find that task nor, if they could find no other work, be prevented by an activity-indicating field from leaving operation C. So, as dequeFind-Work( )'s thirteenth and fourteen lines indicate, that routine sets the executing thread's status-word field to the active state. Only after doing so does it call the findWorkHelper( ) routine and thereby possibly claim a remaining task for that thread. (Note that any task thereby claimed will not necessarily be the same as the task whose discovery caused the thread to set its status-word field.) As the fifteenth and sixteen lines indicate, it marks itself inactive again if find-WorkHelper( ) nonetheless fails to claim a task, and the loop beginning on the seventh line begins again. Otherwise, the dequeFindWork( ) routine returns the identifier of the claimed task, which the executing thread accordingly performs.

In this way, all threads keep working on Operation C so long as work remains.

Although we have described the present invention by way of a parallel-execution operation in a garbage collector's collection cycle, its applicability is clearly much broader. Any operation that includes dynamically identified tasks can benefit from the present invention's teachings of having the tasks' execution sequence respond to the relationships among those tasks. The present invention thus constitutes a significant advance in the art.

What is claimed is:

1. A computer system configured to:
A) provide a plurality of task queues, each having a top end and a bottom end and in which can be stored and from which can be retrieved task identifiers, which identify tasks to be performed; and
B) for each provided task queue, employ a separate execution thread associated therewith to:
  i) select repeatedly a current access mode from one of a LIFO access mode and a FIFO access mode in accordance with a mode-selection criterion; and
  ii) perform dynamically identified tasks, wherein each said dynamically identified task is a garbage-collection task for performing, for a given object associated with that task, processing that includes identifying in the given object references to other objects, and thereby identifying the tasks of performing similar processing for is those other objects, by repeatedly:
    a) popping a task identifier from one of the top end or the bottom end of that task queue in order to access that task queue in a LIFO access mode or a FIFO access mode in accordance with the current access mode;
    b) so performing the task thereby identified as, in at least some instances, to find one or more further tasks to be performed; and
    c) pushing onto that task queue task identifiers that identify any tasks thus found.

2. A computer system as defined in claim 1 wherein pushing occurs at, the bottom end of each provided task queue, popping in accordance with the FIFO access mode occurs at the top end of each provided queue, and popping in accordance with the LIFO access mode occurs at the bottom end of each provided task queue.

3. A computer system as defined in claim 1 wherein queue accesses in each provided task queue are circular.

4. A computer system as defined in claim 1 wherein the task identifiers are identifiers of the objects associated with tasks that the task identifiers identify.

5. A computer system as defined in claim 4 wherein the task identifiers are pointers to the objects associated with the tasks that the task identifiers identify.

6. A computer system as defined in claim 1 wherein, in at least some instances, an execution thread associated with a task queue that is empty:
A) pops a task identifier from a task queue other than the one with which it is associated;
B) so performs the task thereby identified as, in at least some instances, to find one or more further tasks to be performed; and
C) pushes onto the task queue associated with it task identifiers that identify any tasks thus found.

7. A computer system as defined in claim 6 wherein each said dynamically identified task is the garbage-collection task of performing, for a given object associated with that task, processing that includes identifying in the given object references to other objects and thereby identifying the tasks of performing similar processing for those other objects.

8. A computer system as defined in claim 1 wherein the mode-selection criterion is based on the number of entries in the task queue.

9. For performing dynamically identified tasks, a method comprising employing a computer system to:
A) provide a plurality of task queues, each having a top end and a bottom end and in which can be stored and from which can be retrieved task identifiers, which identify tasks to be performed; and
B) for each provided task queue, employ a separate execution thread associated therewith to:
  i) select repeatedly a current access mode from one of a LIFO access mode and a FIFO access mode in accordance with a mode-selection criterion; and
  ii) perform dynamically identified tasks, wherein each said dynamically identified task is the garbage-collection task of performing, for a given object associated with that task, processing that includes identifying in the given object references to other objects and thereby identifying the tasks of performing similar processing for those other objects, by repeatedly;
    a) popping a task identifier from one of the top end or the bottom end of that task queue in order to access that task queue in a LIFO access mode or a FIFO access mode in accordance with the current access mode;
    b) so performing the task thereby identified as, in at least some instances, to find one or more further tasks to be performed; and c) pushing onto that task queue task identifiers that identify any tasks thus found.

10. A method as defined in claim 9 wherein pushing occurs at the bottom end of each provided task queue, popping in accordance with the FIFO access mode occurs at the top end of each provided task queue and popping in accordance with the LIFO access mode occurs at the bottom end of each provided task queue.

11. A method as defined in claim 9 wherein queue accesses in each provided task queue are circular.

12. A method as defined in claim 9 wherein the task identifiers are identifiers of the objects associated with tasks that the task identifiers identify.

13. A method as defined in claim 12 wherein the task identifiers are pointers to the objects associated with the tasks that the task identifiers identify.

14. A method as defined in claim 9 wherein, in at least some instances, an execution thread associated with a task queue that is empty:
   A) pops a task identifier from a task queue other than the one with which it is associated;
   B) so performs the task thereby identified as, in at least some instances, to find one or more further tasks to be performed; and
   C) pushes onto the task queue associated with it task identifiers that identify any tasks thus found.

15. A method as defined in claim 14 wherein each said dynamically identified task is the garbage-collection task of performing, for a given object associated with that task, processing that includes identifying in the given object references to other objects and thereby identifying the tasks of performing similar processing for those other objects.

16. A method as defined in claim 9 wherein the mode-selection criterion is based on the number of entries in the task queue.

17. A storage medium containing instructions readable by a computer system to cause the computer system to:
   A) provide a plurality of task queues, each having a top end and a bottom end and in which can be stored and from which can be retrieved task identifiers, which identify tasks to be performed; and
   B) for each provided task queue, employ a separate execution thread associated therewith to:
      i) select repeatedly a current access mode from one of a LIFO access mode and a FIFO access mode in accordance with a mode-selection criterion; and
      ii) perform dynamically identified tasks, wherein each said dynamically identified task is the garbage-collection task of performing, for a given object associated with that task, processing that includes identifying in the given object references to other objects and thereby identifying the tasks of performing similar processing for those other objects, by repeatedly:
         a) popping a task identifier from one of the top end or the bottom end of that task queue in order to access that task queue in a LIFO access mode or a FIFO access mode in accordance with the current access mode;
         b) so performing the task thereby identified as, in at least some instances, to find one or more further tasks to be performed; and
         c) pushing onto that task queue task identifiers that identify any tasks thus found.

18. A storage medium as defined in claim 17 wherein pushing occurs at the bottom end of each provided queue, popping in accordance with the FIFO access mode occurs at the top end of each provided queue, and popping in accordance with the LIFO access mode occurs at the bottom end of each provided queue.

19. A storage medium as defined in claim 17 wherein queue accesses in each provided task queue are circular.

20. A storage medium as defined in claim 17 wherein the task identifiers are identifiers of the objects associated with tasks that the task identifiers identify.

21. A storage medium as defined in claim 20 wherein the task identifiers are pointers to the objects associated with the tasks that the task identifiers identify.

22. A storage medium as defined in claim 17 wherein, in at least some instances, an execution thread associated with a task queue that is empty
   A) pops a task identifier from a task queue other than the one with which it is associated;
   B) so performs the task thereby identified as, in at least some instances, to find one or more further tasks to be performed; and
   C) pushes onto the task queue associated with it task identifiers that identify any tasks thus found.

23. A storage medium as defined in claim 22 wherein each said dynamically identified task is the garbage-collection task of performing, for a given object associated with that task, processing that includes identifying in the given object references to other objects and thereby identifying the tasks of performing similar processing for those other objects.

24. A storage medium as defined in claim 17 wherein the mode-selection criterion is based on the number of entries in the task queue.

25. A computer system, comprising:
   A) means for providing a plurality of task queues, each having a top end and a bottom end and in which can be stored and from which can be retrieved task identifiers, which identify tasks to be performed; and
   B) for each provided task queue, means for employing a separate execution thread associated therewith to:
      i) select repeatedly a current access mode from one of a LIFO access mode and a FIFO access mode in accordance with a mode-selection criterion; and
      ii) perform dynamically identified tasks, wherein each said dynamically identified task is the garbage-collection task of performing, for a given object associated with that task, processing that includes identifying in the given object references to other objects and thereby identifying the tasks of performing similar processing for those other objects, by repeatedly:
         a) popping a task identifier from one of the top end or the bottom end of that task queue in order to access that task queue in a LIFO access mode or a FIFO access mode in accordance with the current access mode;
         b) so performing the task thereby identified as, in at least some instances, to find one or more further tasks to be performed; and
         c) pushing onto that task queue task identifiers that identify any tasks thus found.

26. A computer system as defined in claim 25 wherein the mode-selection criterion is based on the number of entries in the task queue.

* * * * *

UNITED STATES PATENT AND TRADEMARK OFFICE
CERTIFICATE OF CORRECTION

PATENT NO. : 7,103,887 B2  Page 1 of 1
APPLICATION NO. : 09/893256
DATED : September 5, 2006
INVENTOR(S) : Nir N. Shavit et al.

It is certified that error appears in the above-identified patent and that said Letters Patent is hereby corrected as shown below:

In the Claims:

In claim 1, column 17 (line 64), delete "is".

Signed and Sealed this

Third Day of April, 2007

JON W. DUDAS
*Director of the United States Patent and Trademark Office*